United States Patent Office 3,847,991
Patented Nov. 12, 1974

3,847,991
PROCESS FOR THE PREPARATION OF ETHAMBUTOL[2,2'-(ETHYLENE DIAMINO)-DI-BUTANE-1-OL]
Luigi Bernardi, Maurizio Foglio, and Aldemio Temperilli, Milan, Italy, assignors to Farmitalia Societa Farmaceutici Italia, Milan, Italy
No Drawing. Filed Dec. 26, 1972, Ser. No. 317,936
Claims priority, application Italy, Dec. 30, 1971, 33,117/71
Int. Cl. C07c 91/12
U.S. Cl. 260—584 R                     6 Claims

ABSTRACT OF THE DISCLOSURE

Method for making ethambutol, (+)-2,2'-(ethylendiimino)-di-butan-1-ol which comprises reacting 1,2-epoxy-3-butene with phosgene to form 2-chloro - 3 - buten-1-ol chloroformate; reacting said chloroformate with a benzyl amine of the formula R—$C_6H_4$—$CH_2$—$NH_2$, wherein R is H, methyl, halogen, nitro or amino to form a 2-chloro-3-buten - 1 - ol N-benzylurethane; reacting said N-benzylurethane with an alkaline hydroxide to form 2-benzylamino - 3 - buten-1-ol; resolving said 2-benzyl-amino-3-buten-1-ol into its optical antipodes and reacting the (+) form with a 1,2-dihalo-ethane or 1,2-ditosyloxy-ethane to form the product (+) - 2,2' - (N,N'-dibenzyl-ethylendiimino)-di - 3 - buten-1-ol; and hydrogenating said product to form ethambutol. Desirably, reaction of said N-benzylurethane with said alkaline hydroxide can be effected so as to first form 4-vinyl - 3 - benzyl-oxazolidin-2-one, followed by formation of said 2-benzyl-amino-3-buten-1-ol.

Alternatively, said 4-vinyl - 3 - benzyl-oxazolidin-2-one can be prepared by reacting 4-chloro-2-buten-1-ol with benzyl isocyanate to form 4-chloro-2-buten-1-ol N-benzylurethane, and then treating with an alkaline material to form 4-vinyl-3-benzyl-oxazolidin-2-one.

BACKGROUND OF THE INVENTION (1) Field of the Invention

The present invention relates to a new process for the production of ethambutol and to certain products used in such process.

(2) Description of the Prior Art

Ethambutol, which is the generic name for (+)-2,2'-(ethylendiimino)-di-butan-1-ol, is a product that has been known since 1961 (J. Am. Chem. Soc. *83*, 1961, p. 2212), and which exhibits a marked antitubercular activity.

Many methods of preparing ethambutol have been described both in the scientific and patent literature. See, for example, R. G. Wilkinson et al., J. Am. Chem. Soc., *83*, 1961, p. 2212; U.S. Pat. 3,176,040; and Japanese Pat. 15,165/65 to Kaken Kagaku.

The processes described and claimed in the above patents for the preparation of 2,2'-(ethylendiimino)-di-butan-1-ol mainly comprise either reacting 2-amino-1-butanol in considerable excess with a dihalo-ethane, or in condensing 2-amino-1-butanol with glyoxal under reducing conditions. In spite of the large excess of 2-amino-1-butanol, the main reaction affording 2,2'-(ethylendiimino)-di-butan-1-ol is always accompanied by undesired side reactions. Thus, inasmuch as the amine is a primary amine, piperazines, aziridines and linear condensation products (polymers) are formed. In addition, due to the presence of an alcohol function, which can also react, ethers and morpholines are formed.

In this case, therefore, the synthesis gives the desired end product, albeit in low yields, in admixture with undesired and often toxic products. From the literature it is known that 2,2'-(ethylendiimino)-di-butan-1-ol in the racemic and "meso" forms show, in addition to antitubercular activity, a potential toxicity that can affect one's vision. (See, for example, R. Carr et al., Arch. Ophthal., *67*, 1962, p. 566 and *68*, 1962, p. 718).

The end product obtained according to the methods described and claimed in the above patents, starting from racemic 2-amino-1-butanol, is always represented by the racemic and "meso" forms. Obviously, this tends to limit extensive use of the end product as such (obtained according to the processes of the above patents).

Furthermore, the average yield obtained in each of the foregoing processes is rather low, so that such processes are not very economical.

2-amino - 1 - butanol is usually obtained from 1-nitropropane, the latter ordinarily being industrially prepared by nitrating lower hydrocarbons in the vapor phase. This is a very dangerous operation which requires strict precautions and specially designed plants.

1-nitro-propane is then reacted with formaldehyde to give a mixture of 2-ethyl - 2 - nitropropan-1,3-diol and 2-nitro-1-butanol. The 2-nitro-1-butanol is then separated by distillation in a suitably designed plant, due to the hazardous operation, and this is followed by reduction to 2-amino-1-butanol.

A further disadvantage in the use of 2-amino-1-butanol to produce ethambutol is the considerable difficulty in recovering the excess of 2-amino-1-butanol over and above that necessary for the reaction, inasmuch as 2-amino-1-butanol is highly miscible with water.

SUMMARY OF THE INVENTION

We have now found a novel and valuable process for preparing ethambutol in high yields and without either the undesired by-products or the racemic form being present. Our process, in one aspect, utilizes 1,2-epoxy-3-butene as the starting material, i.e., a product of basic chemical industry that is much more readily available than 2-amino-1-butanol. The process involves a sequence of reactions that are easily carried out on an industrial scale, thereby economically achieving the desired end product. Moreover, inasmuch as 1,2-epoxy-3-butene is employed, it can be easily recovered because it is insoluble in water.

The present invention further provides an advantageous process for preparing unsaturated intermediates of ethambutol according to the series of reactions described below. In one aspect, this involves reacting 1,2-epoxy-3-butane (I) with phosgene to form 2-chloro-3-buten-1-ol chloroformate (II); then reacting with a benzyl amine to form the corresponding N-benzyl-urethane (III); treating with an alkali hydroxide to form 4-vinyl-3-benzyl-oxazolidin-2-one (IV), or treating with an alkali hydroxide under heat to form 2-benzylamino-3-buten-1-ol (V) and resolving it into its optical antipodes; reacting the (+) form with, e.g., a dihalo-ethane to form (+)-2,2'-(N,N'-dibenzyl-ethylendiimino)-di-3-buten-1-ol (VI); followed by reduction to form ethambutol (VII). It should be noted that each of compounds II through VI is a new compound not described in the literature.

Alternatively, the 4-vinyl - 3 - benzyl-oxazolidin-2-one (IV) can be prepared by reacting 4-chloro-2-buten-1-ol (I') with benzyl isocyanate (II') to form 4-chloro-2-buten-1-ol N-benzylurethane (III'), and then treating with an alkaline material to form said 4-vinyl-3-benzyl-oxazolidin-2-one (IV).

DESCRIPTION OF THE PREFERRED EMBODIMENTS

Our new process for preparing ethambutol will be illustrated in detail subsequently, and, in one aspect, comprises reacting 1,2-epoxy-3-butene (I), an industrial product readily obtainable from butadiene, with phosgene to give 2-chloro-3-buten-1-ol chloroformate (II). This (II) is then reacted with a benzylamine, $$R—C_6H_4—CH_2NH_2$$

(wherein R is H, methyl, halogen, nitro, or amino), to yield a 2-chloro-3-buten-1-ol N-benzylurethane (III). On treating this product (III) with an alkali hydroxide, 4-vinyl 3-benzyl-oxazolidin-2-one (IV) is formed, which, at higher temperature and in the presence of an excess of alkali hydroxide, gives 2-benzyl-amino-3-buten-1-ol (V). This product (V) is then resolved into its optical antipodes. The (+)-2-benzyl-amino-3-buten-1-ol antipode is condensed with a difunctional ethane derivative such as a 1,2-dihalo-ethane or 1,2-ditosyloxy-ethane to give (+)-2,2′-(N,N′-dibenzyl-ethylendiimino) - di - 3 - buten-1-ol (VI). This product (VI), upon catalytic hydrogenation, gives (+)-2,2′-(ethylendiimino)-butan-1-ol (VII), i.e., ethambutol.

The foregoing process may be represented by the following reaction sequence:

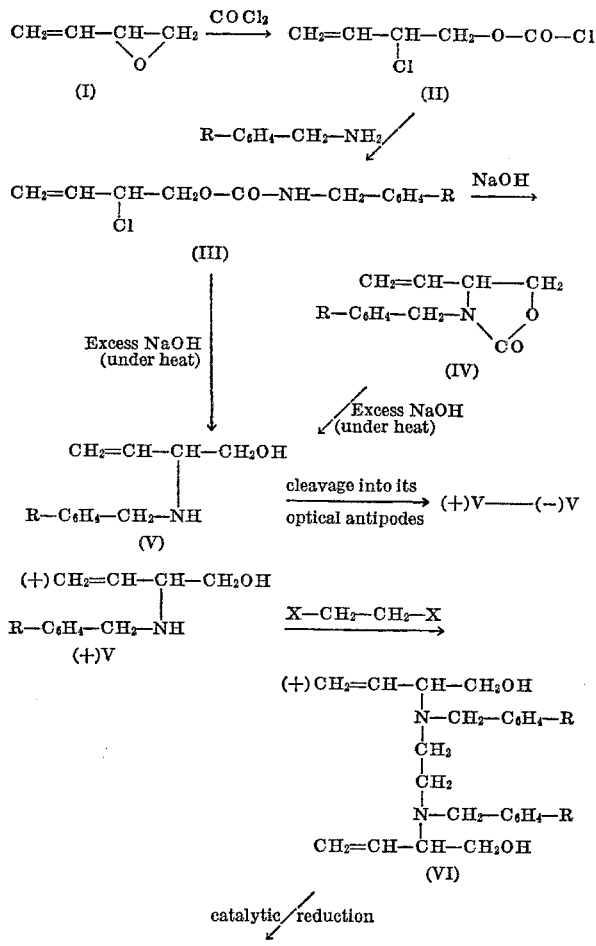

(+)-2,2′-(ethylendiimino)-
di-butan-1-ol
[Ethambutol] (VII)

wherein R is hydrogen, methyl, halogen, nitro or amino; and wherein X is halogen.

1,2-epoxy-3-butene (I), the starting product for the above process, is a liquid boiling at 66° C. This material, either alone or dissolved in a suitable solvent, is added, with stirring at a low temperature, desirably from about —40 to —20° C., to 1 to 2 equivalents of either liquid phosgene or phosgene in solution in an aliphatic or cyclic ether such as ethyl ether, dioxane, tetrahydrofuran or a halogenated hydrocarbon such as dichloromethane or dichloroethane, in the presence of a catalytic quantity of a tertiary nitrogen base such as pyridine or the like.

The reaction takes place at the above low temperature; however, preferably the reaction is completed at room temperature over a period of from about 12 to 24 hours.

When the reaction is completed, the excess phosgene and solvents, if present, are removed under reduced pressure.

The desired product, 2-chloro-3-buten-1-ol chloroformate (II), is distilled at 76° C. under 28 mm. Hg.

From the literature (A. Rosowsky; Heterocyclic Compounds With 3- and 4-Membered Rings—A. Weissgerber Ed.—Interscience, New York, 1964, p. 438) it is known that 1,2-epoxides of the structure of

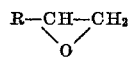

react with phosgene to give 1-chloroalcohol chloroformates of the structure

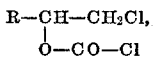

having the secondary alcohol function blocked by the —CO—Cl moiety. Therefore, according to the prior art, the reaction of 1,2-epoxy-3-butene with phosgene would have been expected to produce the compound

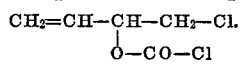

On the contrary, we have surprisingly found that instead, the compound (II) is formed.

Said compound (II) is then reacted with a benzylamine at low temperatures, e.g., from about —5° C. to +10° C., to yield the corresponding 2-chloro-3-butene-1-ol-N-benzylurethane (III). The reaction may be performed in a suitable diphase system in the presence of alkali under strong stirring or in an inert solvent using an excess of benzylamine as the hydrochloric acid acceptor.

The urethane (III), obtained in almost quantitative yield, is treated with an equivalent of an alkali hydroxide such as sodium or potassium hydroxide in a water-alcohol solution. The reaction takes place at room temperature; however, it is preferably completed at the boiling point of the alcohol employed, by heating at such temperature for a few minutes. At the end of the reaction, the mixture is cooled and the desired product, 4-vinyl-3-benzyl-oxazolidin-2-one (IV), is extracted with a water immiscible solvent. This product, (IV), is isolated as an oily residue by evaporating the solvent employed.

The conversion of compound (III) into compound (IV) in almost theoretical yields is even more surprising, inasmuch as it is known from the literature that allyl compounds such as compound (III) normally react with nucleophilic reagents, giving substitution products, i.e., accompanied by an allyl transposition. (For example, on reacting alpha-methyl-allylchloride, $$CH_2=CH—CHCl—CH_3,$$

with dimethylamine and with trimethylamine, there are obtained the compounds

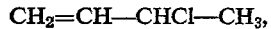

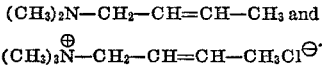

See JACS, 73; 1076, 1951, 77; 3061, 1955 and 79; 4793, 1957.)

On reacting compound (IV) without further purification under heat with an excess of alkali hydroxide in a water-alcohol solution, 2-benzylamino-3-buten-1-ol (V) is obtained in good yield. Alternatively, compound (III), by treatment at higher temperature and in the presence of an excess of alkali hydroxide, directly yields the amino-alcohol (V) in good yields.

Thereafter, resolution of the optical antipodes of the amino-alcohol (V) is caried out to obtain the isomer (+)V, which ismer is necessary to complete the synthesis.

The resolution can be carried out according to conventional methods for resolving optically active organic bases, although in the literature there are not many examples in the field of unsaturated amino-alcohols. Satisfactory results may be achieved employing mandelic acid, tartaric acid derivatives, such as di-benzoyl-tartaric acid having the benzene ring either free or substituted by nitro-, halogen-, alkyl-, alkoxy-groups, etc. Employing (+)-dibenzoyltartaric acid and operating in ethanol-isopropanol under heat to form, by salt formation, the neutral salt of (V), on cooling, the compound which first precipitates is (+)-2-benzoylamino-3-buten-1-ol (+)-dibenzoyltartrate.

The other optical antipode, namely, (—)-2-benzylamino-3-buten-1-ol (+)-dibenzoyltartarte, remains in solution.

By treatment of (+)-2-benzylamino-3-buten-1-ol (+)-dibenzoyltartrate with an aqueous solution of a suitable base such as alkali hydroxide, ammonia, or the like, in the presence of a water-immiscible solvent, (+)-2-benzylamino-3-buten-1-ol is released and passes into the organic layer, from which it is isolated.

By acidifying the aqueous layer, the (+)-dibenzoyltartaric acid is recovered and recycled.

Alternatively, the less expensive (—)-dibenzoyltartaric acid can be employed. In such instance, (+)-2-benzylamino-3-buten-1-ol (—)-di-benzoyltartrate remins in solution and from it, by treatment with alkali, there is released (+)-2-benzylamino-3-buten-1-ol along with minor amounts of racemate, which racemate is removed by recrystallization from cyclohexane. (The racemate base is less soluble and it is the first to be separated.)

Alternatively, the resolution may be carried out with (—) mandelic acid, taking advantage of the fact that (+)-2-benzyl-amino-3-buten-1-ol (—) mandelate is less soluble in ethyl acetate, isopropanol and acetone than the diastereomer salt (—)-2-benzyl-amino-3-buten-1-ol (—) mandelate.

The dextrorotatory optical antipode, (+)-2-benzyl-amino-3-buten-1-ol [(+) V], is reacted with a difunctional ethane derivative such as a 1,2-dihalo-ethane or 1,2-ditosyloxy-ethane, and preferably 1,2-dicholorethane or 1,2-dibromoethane.

An excess of (+)V (4–5 moles), which also serves as an acid acceptor, is generally employed, thereby obtaining a mixture of (+)-2,2'-(N,N'-dibenzyl-ethylendiimino)-di-3-buten-1-ol (VI), which is the intermediate product necessary to carry on the synthesis, and (+)V in the form of its salt.

The reaction may take place in the presence or absence of a suitable solvent. In the latter case, the two reagents are heated to the boiling point temperature of one of them.

The reaction is carried out at atmospheric pressure or under positive pressure. At the end of the reaction, the mixture is cooled and mixed with water and with a water-immiscible solvent with strong stirring.

Compound (VI) is dissolved in the solvent, while in the aqueous layer the excess of (+)V remains dissolved as a salt and may be quantitatively recovered and recycled. The solution containing compound (VI) is evaporated "in vacuo" to dryness, the oily residue is taken up with ethanol and mixed with the stoichiometric quantity of anhydrous gaseous hydrochloric acid. The dihydrochloride salt of (VI) is crystallized by cooling; it is filtered and then washed with a small amount of cold ethanol.

This compound, (VI), heretofore has not been described in the literature. When R is H, its properties are as described in Example 9, hereinafter.

Compound (VI) is dissolved, generally as the dihydrochloride, in a suitable solvent, such as an anhydrous or aqueous lower aliphatic alcohol, tetrahydrofuran or dioxane, and is then hydrogenated in the presence of a suitable catalyst. The catalyst may be any of the conventional hydrogenation catalysts usually employed. Metals from Group VIII of Periodic Table are generally employed. Preferably there are employed platinum, palladium, their salts or oxides, either as such or deposited on a conventional support such as carbon, barium sulfate, calcium carbonate, or the like. Good results may also be achieved by employing Raney nickel.

The ratio between catalyst and compound (VI) is not critical. Generally the catalyst will be employed in an amount from about 0.1 to 20% by weight, based on the amount of compound (VI). The hydrogen pressure may vary considerably, and preferably is from atmospheric pressure to 100 atmospheres. Likewise the temperature may vary appreciably and preferably is from room temperature to 80° C.

The hydrogenation reaction may be followed by measuring the hydrogen adsorption. At the end of the hydrogenation, the catalyst is filtered and the filtrate is evaporated "in vacuo" to dryness, obtaining crude ethambutol dihydrochloride, which may be purified by recrystallization from a suitable solvent, such as ethanol, or transformed into other salts with pharmaceutically acceptable acids.

The following examples will further illustrate the foregoing aspect of this invention. All parts are by weight unless otherwise stated.

EXAMPLE 1

2-chloro-3-buten-1-ol-chloroformate (II)

760 g. of phosgene were condensed in 1500 ml. of ethyl ether. 0.1 ml. of pyridine was added, and then 355 g. of 1,2-epoxy-3-butene were added dropwise over a one hour period with stirring, maintaining the temperature at —30° C. The mixture was maintained at —30° C. for 3 hours with stirring, then was permitted to stand overnight at room temperature. The excess phosgene and ethyl ether were removed "in vacuo," and the residue was distilled at 28 mm. Hg and the fraction passing at 76° C. was collected. 810 g. of colorless liquid product were obtained.

I.R. spectrum (film): Bands at 1775; 1150; 985; 940; 840; 815 cm.$^{-1}$.

Analogous results were achieved without adding pyridine; however the reaction periods were longer.

EXAMPLE 2

2-chloro-3-buten-1-ol N-benzylurethane (III)

313 g. of sodium carbonate were dissolved in 1500 ml. of water and crushed ice; then 332 g. of benzylamine were added in 1500 ml. of benzene. 500 g. of 2-chloro-3-buten-1-ol chloroformate (II) were added dropwise with vigorous stirring over a period of 90 minutes to maintain the internal temperature at about 10–15° C.

The mixture was stirred for one hour.

The organic phase was then separated and evaporated "in vacuo" to dryness. 686 g. of a semisolid residue of 2-chloro-3-buten-1-ol N-benzylurethane (III) were obtained, having a freezing point at 24–25° C.

I.R. spectrum (CH$_2$Cl$_2$): Bands at 3450; 1725; 1510 cm.$^{-1}$.

EXAMPLE 3

2-chloro-3-buten-1-ol N-benzylurethane (III)

50 g. of 2-chloro-3-buten-1-ol chloroformate were added to a solution (cooled externally by an ice water jacket) of 64 g. of benzylamine in 100 ml. of chloroform at 0° C. After 3 hours, the whole was diluted with water and the chloroform solution was concentrated in "in vacuo" to dryness.

74.7 g. of a semisolid residue (III) were obtained. Benzylamine was recovered from the aqueous layer by rendering the medium alkaline and by extraction.

Operating in the same manner, but employing, instead of benzylamine, various derivatives of the formula R—C$_6$H$_4$—CH$_2$—NH$_2$, wherein R was methyl, halogen, nitro, or amino, the corresponding substituted N-benzylurethanes were obtained.

EXAMPLE 4

4-vinyl-3-benzyl-oxazolidine-2-one (IV)

11.4 g. of 85% potassium hydroxide were added at 40° C. over a period of one hour to a solution of 34 g. of 2-chloro-3-buten-1-ol N-benzylurethane in 40 ml. of ethanol. The mixture was refluxed for 2–3 minutes, cooled and diluted with water. It was then extracted with methylene chloride. The extract thus obtained was concentrated "in vacuo." 27.8 g. of an oily residue consisting of 4-vinyl-3-benzyl-oxazolidin-2-one were obtained.

I.R. spectrum (film): Bands at 1745; 1410; 1250; 1090; 1060; 765; 705 cm.$^{-1}$.

Operating in the same manner, but employing the other derivatives of 2-chloro-3-buten-1-ol N-benzylurethane as described in Example 3, the corresponding oxazolidinones were obtained with the benzyl moiety substituted in the 3 position.

EXAMPLE 5

2-benzylamino-3-buten-1-ol (V)

To a solution of 7.84 g. of sodium hydroxide in 60 ml. of ethanol, there were added 10 g. of 4-vinyl-3-benzyl-oxazolidin-2-one dissolved in a small amount of ethanol, and the mixture was heated to reflux for 3 hours. The mixture was cooled, taken up with water and extracted with methylene chloride. The extract thus obtained was evaporated "in vacuo" to dryness. The solid residue was pulped in a small amount of cyclohexane and filtered. 8.0 g. of 2-benzylamino-3-buten-1-ol were obtained, melting at 77–79° C.

I.R. spectrum (KBr): Bands at 3280; 1060; 750; 700 cm.$^{-1}$.

EXAMPLE 6

2-benzylamino-3-buten-1-ol (V)

670 g. of 2-chloro-3-buten-1-ol N-benzylurethane were poured into a solution of 456 g. of sodium hydroxide in 320 ml. of ethanol. The mixture was refluxed for 3 hours, concentrated, diluted with water, and extracted with methylene chloride.

It was then evaporated to dryness and the solid residue was pulped in a small amount of cyclohexane. 400 g. of 2-benzylamino-3-buten-1-ol were obtained, melting at 77–79° C.

EXAMPLE 7

(+)-2-benzylamino-3-buten-1-ol (+)V 172 g. of 2-benzylamino-3-buten-1-ol and 185.3 g. of (+)-dibenzyltartaric acid were dissolved in 1375 ml. of ethanol and 3440 ml. of isopropanol under heat.

After cooling and permitting the solution to stand for 6 hours, 89.1 g. of neutral salt were collected, m.p. 173–174° C.; $[\alpha]_D^{20}$ +74° (c.=1, H$_2$O); then, a further product was collected which, by recrystallization from the same solvents, gave an additional 51 g. of salt having the same characteristics. This salt was suspended in water and chloroform, and the medium was made sharply alkaline by adding concentrated aqueous ammonia.

The organic layer was evaporated "in vacuo" to dryness and 69 g. of (+)-2-benzylamino-3-buten-1-ol were obtained; m.p. 63–65° C.; $[\alpha]_D^{20}$ +34° (c.=3, EtOH).

By acidifying the ammoniacal aqueous layer, the (+)-dibenzoyltartaric acid may be recovered and recycled.

EXAMPLE 8

(+)-2-benzylamino-3-buten-1-ol (+)V 50 g. of 2-benzylamino-3-buten-1-ol and 43 g. of (−)-mandelic acid were dissolved in 400 ml. of isopropanol. After crystallization started, this mixture was allowed to stand overnight at 0° C. By filtration the (+)-2-benzylamino-3-buten-1-ol (−)-mandelate salt was collected, melting at 92–94° C.; $[\alpha]_D^{20}$ −45° (c.=5, EtOH).

This salt was dissolved in water, the stoichiometric quantity of NaOH was added, and the whole was extracted with chloroform. The solvent was evaporated "in vacuo" to dryness and (+)-2-benzylamino-3-buten-1-ol was obtained, melting at 62–63° C.; $[\alpha]_D^{20}$ +32° (c.=3, EtOH).

EXAMPLE 9

(+)-2,2'-(N,N'-dibenzyl-ethylendiimino)-di-3-buten-1-ol hydrochloride (VI)

15 g. of (+)-2-benzylamino-3-buten-1-ol and 4.05 g. of 1,2-dibromoethane were heated for 2 hours at 120–135° C. The mixture was cooled, and then was taken up with 100 ml. of water and 100 ml. of chloroform. The chloroform layer was washed once again with 100 ml. of 0.1N hydrochloric acid. From the aqueous layer, upon alkalinization, 7.58 g. of (+)-2-benzylamino-3-buten-1-ol were recovered, which may be recycled as such. The organic layer was evaporated "in vacuo" to dryness and the residue was taken up with 20 ml. of ethanol. The stoichiometric quantity of anhydrous gaseous hydrochloric acid in ethanol was added thereto and the whole was allowed to stand overnight at room temperature.

The resulting crystalline precipitate was filtered and washed with a small quantity of cold ethanol. 8.33 g. of (+) - 2,2' - (N,N' - dibenzyl - ethylendiimino) - di - 3-buten - 1 - ol hydrochloride were obtained, melting at 210–212° C.; $[\alpha]_D^{20}$ +15.4° (c.=5, H$_2$O).

Analogous results were achieved when, instead of using 1,2-dibromomethane, 1,2 - dichloroethane or 1,2 - ditosyloxyethane were employed.

EXAMPLE 10

(+)-2,2'-(ethylendiimino)-di-butan-1-ol (VII)

To a solution of 20 g. of (+)-2,2'-(N,N-dibenzyl-ethylendiimino) - di - 3 - buten - 1 - ol hydrochloride in 500 ml. of 90° methanol, 1 g. of 10° palladium on charcoal was added and the mixture was hydrogenated at 25° C. under atmospheric pressure. After an hour, the catalyst was filtered, the solution was evaporated "in vacuo" to dryness, and the residue was recrystallized from ethanol.

11 g. of (+) - 2,2' - (ethylendiimino) - di - butan - 1-ol (ethambutol) were obtained as the hydrochloride, which was crystallized from 90° ethanol to give ethambutol (VII), melting at 198–201° C.;

$$[\alpha]_D^{20} +5.9° (c.=2, H_2O).$$

Analogous results were obtained if, instead of the palladium catalyst, other hydrogenation catalysts were employed, such as platinum, platinum dioxide, and Raney nickel.

As noted previously, according to another aspect of our invention, we have discovered an alternative method for the preparation of 4 - vinyl - 3 - benzyl - oxazolidin-2-one (IV), this alternative method being highly advantageous.

The starting material which we employ, according to this aspect of the invention, is 4 - chloro - 2 - buten - 1-ol (I'). This product (I') can readily be prepared utilizing the teachings in German Pat. 857,369, by the action of hydrochloric acid on 2-buten-1,4-diol, a product of basic chemical industry.

4-chloro-2-buten-1-ol (I') is reacted with benzylisocyanate (II') under heat in a suitable solvent such as, e.g., toluene so as to yield 4-chloro-2-buten-1-ol N-benzylurethane (III').

This product (III') is then dissolved in a suitable solvent in the presence of an alkaline material and reacted to produce 4 - vinyl - 3 - benzyl - oxazolidin - 2 - one (IV) in virtually quantitative yields. Sodium hydride or sodium amide are examples of suitable alkaline materials. Suitable solvents include aliphataic ethers and aromatic hydrocarbons. More simply, an alkali hydroxide may be employed, such as sodium or potassium hydroxide, dissolved in a tertiary alcohol such as t-butanol.

This reaction is quite surprising. Thus, due to the reaction medium employed, one might well expect the formation of compounds as a result of nucleophilic substitution on the allyl carbon atom, e.g., a compound such as

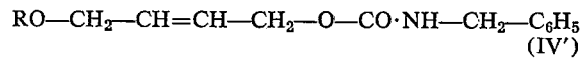

[where R=H or t-butyl]. On the contrary, however, the conversion of compound (III') into compound (IV) is virtually quantitative.

The process of this aspect of our invention may be represented by the following sequence:

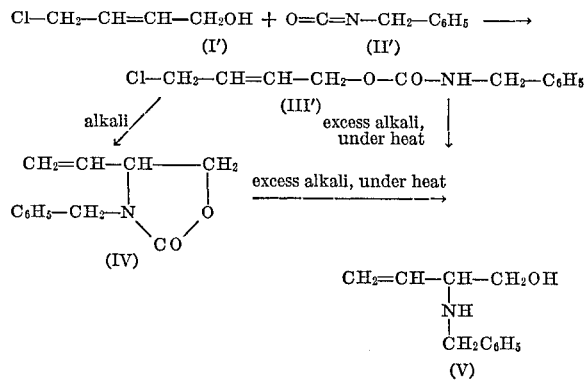

The formation of compound (V) can be carried out in the same reaction medium, adding additional alkali and heating at reflux until there has occurred complete transformation of compound (IV) into 2-benzylamino-3-buten-1-ol (V), as previously described. Alternatively, by treatment at higher temperature and in the presence of an excess of alkali hydroxide, compound (III') directly forms compound (V) and in good yields. (Of course, the subsequent series of reaction steps to convert either compound (IV) or compound (V) to ethambutol are as described previously in connection with the first aspect of this invention.)

The following examples will further illustrate this aspect of our invention.

EXAMPLE 11

4-choro-2-buten-1-ol benzylurethane (III')

A solution of 10 g. of 4-chloro-2-buten-1-ol and 12.6 g. of benzyl isocyanate in 50 ml. of toluene was allowed to stand overnight at 100° C. The toluene was evaporated and the residue was pulped in petroleum ether and filtered. 21.5 g. of 4-chloro-2-buten-1-ol benzylurethane (III') were obtained, having a melting point=52–54° C.

EXAMPLE 12

4-vinyl-3-benzyl-oxazolidin-2-one (IV) and 2-benzyl-amino-3-buten-1-ol (V)

A solution of 0.11 mole of 85% KOH in 15 ml. of t-butanol and 0.5 ml. of water was slowly added at 40° C. to a solution of 20 g. of 4-chloro-2-buten-1-ol benzylurethane (III'). After the addition was completed, the mixture was maintained at 80° C. for 3 hours with strong stirring. 4-vinyl-3-benzyl-oxazolidin-2-one (IV) was then isolated in the form of an oil, by evaporating the t-butanol "in vacuo," taking up with water, extracting with ethyl ether, and finally evaporating off the ethyl ether "in vacuo."

Alternatively, to the t-butanol solution can be added 0.25 mole of 85% KOH in t-butanol (30 ml.) and water (1 ml.), and the mixture then refluxed, with stirring, for an additional 5 hours. The solvent is then evaporated off and the residue is taken up with chloroform. By evaporating the chloroform and pulping the residue in cyclohexane, 12 g. of 2-benzylamino-3-buten-1-ol (V) are obtained.

Analogous results were achieved when in the cyclization of the urethane (III') to 4-vinyl-3-benzyl-oxazolidin-2-one (IV), either sodium hydride or sodium amide was employed as the alkaline material and the solvent was either an aliphatic ether or an aromatic hydrocarbon.

Variations can, of course, be made without departing from the spirit and scope of the invention.

Having thus described the invention, what is desired to be secured by Letters Patent and hereby claimed is:

1. A method for making ethambutol, (+)-2,2'-(ethylendiimino)-di-butan-1-ol, comprising reacting 1,2-epoxy-3-butene with phosgene at a temperature of from about −40° C. to room temperature to form 2-chloro-3-buten-1-ol chloroformate; reacting at a temperature not in excess of room temperature said chloroformate with a benzylamine of the formula R—C$_6$H$_4$—CH$_2$—NH$_2$, wherein R is H, methyl, halogen, nitro or amino, to form a 2-chloro-3-buten-1-ol N-benzylurethane; reacting said N-benzylurethane with an alkali hydroxide to form 2-benzylamino-3-buten-1-ol; resolving said 2-benzylamino-3-buten-1-ol into its optical antipodes; reacting the (+) form with a 1,2-dihalo-ethane or 1,2-ditosyloxy-ethane to form the product (+)-2,2'-(N,N'-di-benzyl-ethylendiimino) - di-3-buten-1-ol; and hydrogenating said product to form ethambutol.

2. The method of claim 1 wherein said reaction with phosgene is carried out in the presence of a tertiary nitrogen base.

3. The method of claim 1 wherein said reaction of said N-benzylurethane with said alkali hydroxide is initially carried out with an equivalent of said hydroxide to form 4-vinyl-3-benzyl-oxazolidin-2-one, and wherein thereafter additional alkali hydroxide is added and the temperature is raised to thereby form said 2-benzylamino-3-buten-1-ol.

4. The method of claim 1 wherein said 2-benzylamino-3-buten-1-ol is resolved into its optical antipodes using an optically active di-benzoyltartaric acid or mandelic acid.

5. The method of claim 1 wherein (+)-2-benzylamino-3-buten-1-ol is reacted with 1,2-dibromoethane.

6. The method of claim 1 wherein hydrogenation of (+)-2,2'-(N,N'-di-benzyl-ethylendiimino) - di-3-buten-1-ol is effected catalytically in the presence of palladium, platinum, or nickel.

References Cited
UNITED STATES PATENTS 3,579,586   5/1971   Zoja _____ 260—584 R LEWIS GOTTS, Primary Examiner D. R. PHILLIPS, Assistant Examiner U.S. Cl. X.R.

260—463, 307 A, 570.5 P, 570.9, 471 C

UNITED STATES PATENT OFFICE
CERTIFICATE OF CORRECTION

Patent No. 3,847,991              Dated   November 12, 1974

Inventor(s) Luigi BERNARDI et al

It is certified that error appears in the above-identified patent and that said Letters Patent are hereby corrected as shown below:

Column 1, line 10: "33,117/71" should read --33,117 A/71--.

Column 3, line 65: "product" should read --material--; line 66: "material," should read --product,--.

Column 4, lines 32-33: "2-chloro-3-butene-1-ol-N-benzylurethane (III)." should read --2-chloro-3-buten-1-ol-N-benzylurethane (III).--; line 72: "caried" should read --carried--.

Column 5, line 10: "(+)-2-benzoylamino-3-buten-1-ol(+)-dibenzoyltartrate." should read -- (+)-2-benzylamino-3-buten-1-ol(+)-dibenzoyltartrate.--; line 24: "remins" should read --remains--; line 73: "of Periodic Table" should read --of the Periodic Table--.

Column 7, line 39: "320 ml." should read --3200 ml.--.

Column 8, line 27: "1,2-dibromomethane," should read --1,2-dibromoethane.--; line 35: "90° methanol" and "10 ° palladium" should read --90% methanol-- and --10 % palladium--; line 42: "90° ethanol" should read -- 90% ethanol--.

Signed and sealed this 11th day of February 1975.

(SEAL)
Attest:

RUTH C. MASON
Attesting Officer

C. MARSHALL DANN
Commissioner of Patents
and Trademarks